Feb. 24, 1970 TAKEHARU TERAOKA 3,497,381
SCALE WITH INDICATORS OF THE PRICE AND THE
WEIGHT OF THE COMMODITY
Filed Aug. 30, 1967

TAKEHARU TERAOKA,
INVENTOR.

BY Wendwoth, Lind
and Ponack,
Attorneys

Feb. 24, 1970

TAKEHARU TERAOKA 3,497,381

SCALE WITH INDICATORS OF THE PRICE AND THE WEIGHT OF THE COMMODITY

Filed Aug. 30, 1967

INVENTOR,
TAKEHARU TERAOKA
BY

United States Patent Office 3,497,381
Patented Feb. 24, 1970

3,497,381
SCALE WITH INDICATORS OF THE PRICE AND THE WEIGHT OF THE COMMODITY
Takeharu Teraoka, 649, Chofu Chidori-cho, Ota-ku, Tokyo, Japan
Filed Aug. 30, 1967, Ser. No. 664,369
Claims priority, application Japan, Sept. 7, 1966, 41/38,653
Int. Cl. G01g 23/32
U.S. Cl. 177—178                                    7 Claims

ABSTRACT OF THE DISCLOSURE

Scale with indicators on both sides for indicating the price and the weight of the commodity by utilizing projection optical system comprising a main body housing therein said optical system, a platform adapted to support the commodity to be measured and vertically movable as a function of the weight of the commodity loaded thereon, scale plate means adapted to be moved by the movement of said platform and carrying thereon price and weight scales, said scales being projected on a viewing screen by said optical system so as to form two sets of images of said scales so that they are viewed from opposite sides of the scale by means of two oppositely inclined mirrors, respectively, said projection optical system permitting the images of the price scale projected onto said projection screen to move in the same direction as that of the weight scale sprojected on said screen thereby avoiding confusion in the reading of the measured values.

BACKGROUND OF THE INVENTION

The present invention relates to an improved scale in which an indicator of the price to be paid for a commodity as well as an indicator of the weight of the commodity is provided, and more particularly, to a novel and useful scale in which the total weight of the commodity to be sold to the customer and the unit price per unit weight of the commodity as well as the total price of the commodity calculated from the total weight of the commodity in accordance with the unit price per unit weight thereof are simultaneously read from both sides of the scale for convenience to both the seller and the customer, wherein an indication of the weight, the unit price per unit weight and the total price of the commodity are projected on viewing screens provided on both sides of the scale so as to be read simultaneously by the seller and the customer.

Scales in which the total weight, the unit price per unit weight, and the total price of the commodity calculated from the total weight in accordance with the unit price per unit weight are indicated only on the side of the seller who measures the commodity are already known.

In such scales, no indication of the result of the calculation is given to the customer who is standing opposite the seller, on the other side of the scale thereby making the customer feel uneasy as to whether or not the calculation is correct.

On the other hand, scales have been developed in which the total weight of the commodity to be sold and the total price thereof are indicated to both the seller and the customer. However, in these scales the weight scale appearing on the screen moves in a direction opposite to the direction of the price scale simultaneously projected on the screen thereby confusing the person who is reading the scales.

SUMMARY OF THE INVENTION

Therefore, one object of the present invention is to provide an improved scale which is compact in size and in which the total weight and the total price calculated from the total weight in accordance with the unit price per unit weight of the commodity to be sold can be read from both sides of the scale for convenience to both the seller and the customer without causing any confusion in the reading of the measured values.

Another object of the present invention is to permit both the seller and the customer to confirm that the correct total price is correctly indicated in accordance with the unit price per unit weight of the commodity by additionally providing in the scale a chart showing the unit prices per unit weight.

Another object of the present invention is to provide a novel and useful scale of the type described above in which an optical system is provided for selectively choosing the scale for indicating the price of the commodity to be measured in accordance with the unit price per unit weight of the commodity, the play in the movement of the movable frame provided in said optical system being minimized by the novel construction of the frame so that the frame is moved accurately and smoothly.

A further object of the present invention is to provide novel means for clearly indicating reference lines to be used in connection with the scales for indicating the weight and the correct price of the commodity on the projection screen provided in conjunction with said optical system.

These and other objects and the advantages of the present invention will be clearly understood by reading the following description of the preferred embodiments of the present invention in connection with the accompanying drawings showing the preferred embodiments.

DESCRIPTION OF THE PREFERRED EMBODIMENTS

Figure 1:
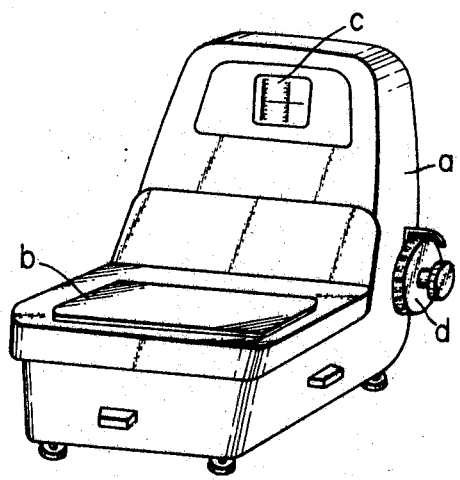
FIG. 1 is a general perspective view of the balance in accordance with the present invention as seen from the side where the item is put on the scale.
Figure 2:
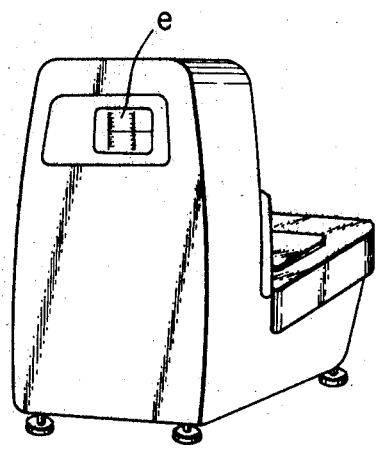
FIG. 2 is a general perspective view of the balance of FIG. 1 as seen from the side opposite that shown in FIG. 1.
Figure 3:
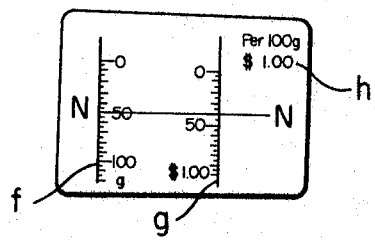
FIG. 3 is a view showing the window in the balance shown in FIGS. 1 and 2 for indicating the projected portions of the scales for the weight and the price of the commodity together with unit price per unit weight of the commodity.

Now referring to FIG. 1, main body $a$ is provided with supporting table $b$ on which the commodity to be weighed is placed. As shown in FIG. 3, projected portion of scale $f$ for indicating the weight of the commodity and projected portion of scale $g$ for indicating the price of the commodity which is selectively chosen from a plurality of price scales in accordance with the unit price per unit weight of the commodity as set forth hereinafter are observed in window $c$ by means of the optical system provided in the scale by the seller, the projected portions of said scales $f$ and $g$ being correctly set in positions with respect to the reference line so as to indicate the correct values of the weight and the price of the commodity. Indication $h$ of the unit price per unit weight of the commodity corresponding to the projected scale g for the price of the commodity is also projected on window c so that the unit price per unit weight of the commodity is simultaneously read together with the total weight and total price of the commodity. Referring to FIG. 2, the same indication is given through window e to the customer as is given through window c to the seller. The switching operation for selecting one of the price charts g in accordance with the unit price per unit weight of the commodity is effected by means of switching knob d, which is actuated manually to change the indication h of the unit price per unit weight of the commodity in windows c and e so that the correct unit weight per unit price of the commodity is observed through each of windows c and e and, at the same time, the correctly selected price scale g appears in each of windows c and e.

Figure 4:
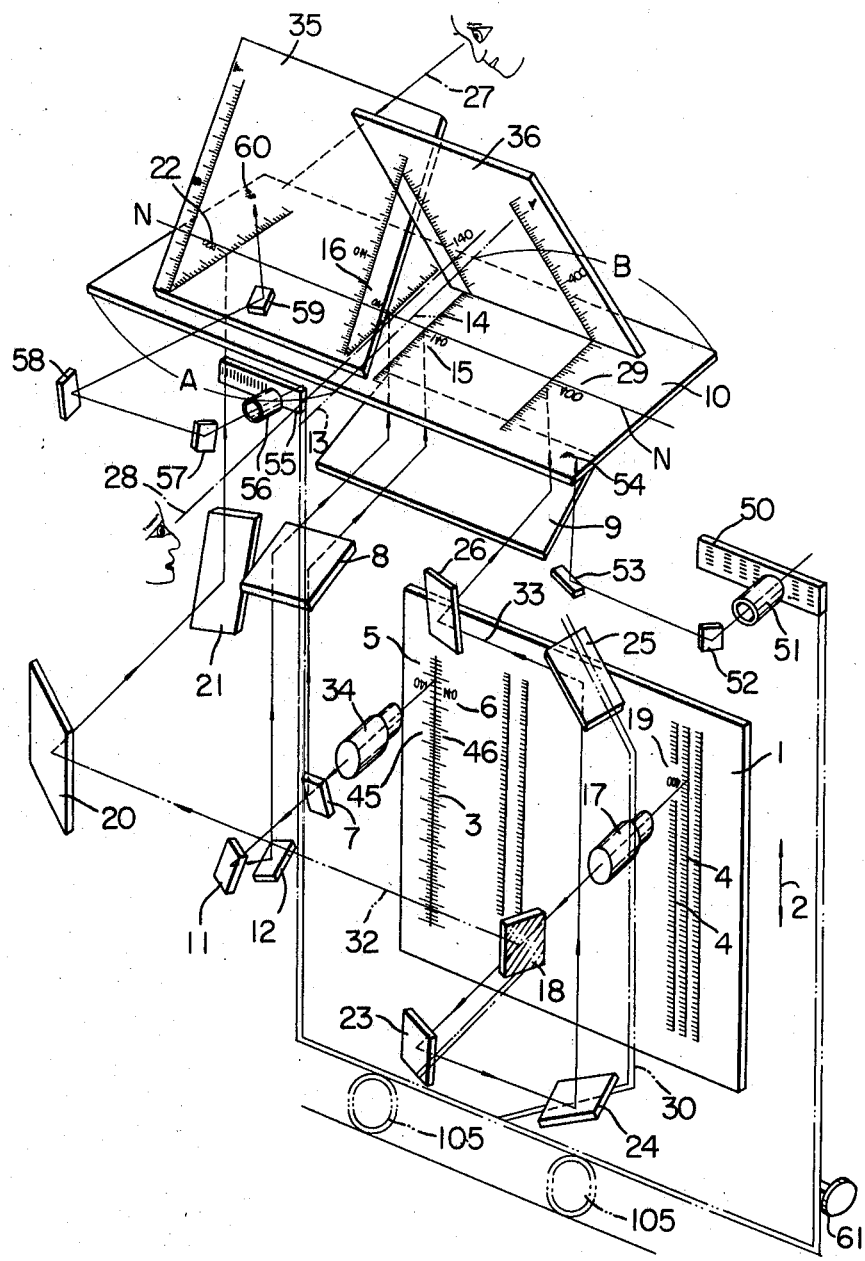
FIG. 4 is a schematic perspective view showing the optical system in the balance of FIGS. 1 and 2 for indicating the scales for the weight and the price of the commodity together with the unit price per unit weight of the commodity.

Detailed construction of the scale in accordance with the present invention will now be described in connection with FIG. 4. Transparent plate 1 provided in the balance and bearing thereon a plurality of scales for the weight and the price is movable vertically as indicated by arrow 2 to the extent determined by the weight of the commodity placed on table b. A set of weight scales 3 and a plurality of price scales 4, each of which price scales 4 indicates total price of the commodity calculated in accordance with different total weights in consideration of various unit prices per unit weight of the commodity, are provided on plate 1 in parallel to the direction of movement 2 of plate 1. Weight scales 3 have two graduations 5 and 6 located closely adjacent to each other as shown in FIG. 4 with one on each side, the numerals 45 indicating the weight on one of the graduations 5 being read from left to right and being in an inverted position while the numerals 46 on the other graduations 6 are in the reverse position and the inverted position. A stationary projection lens 34 is provided in the position in front of plate 1 in alignment with scales 3 for projecting the selected weight 3 onto projection screen 10 through various reflecting means as hereinafter described. A light source (not shown) located behind plate 1 illuminates weight scales 3 for projecting the selected portion of weight scales 3 through lens 34. The numerals 45 in scale 5 which are read from left to right are reflected by a stationary reflector 7 thereby being reversed and then reflected by stationary reflector 8 thereby being returned to left to right reading. The light reflected by reflector 8 is again reflected by stationary reflector 9, the image of numerals 45 carried by the light thereby being reversed and finally reaches projection screen 10 at side B to be focused thereon so that image 15 of numerals 45 in weight scale 5 is formed at side B on screen 10 in reverse. The image 15 of numerals 45 in reverse reading focused on projection screen 10 is read from viewing direction 28 together with reefrence line N—N provided on screen 10 through reflecting mirror 36 reflecting said image and said reference line, the reflection by reflecting mirror 36 providing reading from left to right numerals 45 as viewed from viewing direction 28.

The edge of reflector 7 is located in such a manner that only the light passing through numerals 45 in scale 5 in the optical path of projection lens 34 is reflected by reflector 7 while the remaining light passing through numerals 46 in scale 6 goes ahead of the edge of reflector 7 as shown in FIG. 4. The light going ahead of the edge of reflector 7 which is issued from numerals 46 in scale 6 is reflected by reflector 11 thereby converting reversed numerals 46 into normal reading and then reflected by reflector 12 thereby converting again into reverse reading. The light reflected by reflector 12 is again reflected twice by stationary reflectors 8 and 9 so as to be focused on projection screen 10 at side A so that image 16 of numerals 46 of weight scale 6 is reversed on screen 10 at side A, the position of image 16 of numerals 46 being selected to be in point symmetrical relation about center point 14 in center line 13 which is defined in projection screen 10 with respect to image 15 of numerals 45, i.e. image 16 of numerals 46 is positioned 180° about center point 14 with respect to image 15 of numerals 45. Image 16 of numerals 46 is read from viewing direction 27 which is opposite to viewing direction 28 together with reference line N—N through reflecting mirror 35 reflecting image 16 and reference line N—N, reflection of mirror 35 providing the normal reading of numerals 46 when viewed from viewing direction 27. A plurality of price scales 4 are marked numerals 19 which read from left to right but inverted position which indicate the prices according to the total weight of the commodity calculated by the various unit prices per unit weight. A light source (not shown) located behind plate 1 illuminates price scale 4. The light from price scale 4 passes through horizontally movable projection lens 17. The half of the light having passed lens 17 is reflected by half mirror 18 toward reflector 20, while the remaining half of the light passes through half mirror 18 toward reflector 23. The light reflected by half mirror 18 toward reflector 20 is reflected by reflector 20 toward reflector 21 and reflected again by reflector 21 toward projection screen 10. The light projected on projection screen 10 forms image 22 of illuminated portion of price scale 4 which reads from right to left at side A of screen 10 in such a manner that image 22 is located on screen 10 in parallel and the movement of the image 22 caused by the vertical movement of plate 1 is in the same direction as that of image 16 of weight scale 3. This image 22 is read together with reference line N—N from viewing direction 27 after being reflected by reflector 35, the image 22 being reversed by the reflection by means of reflector 35 so as to be read from left to right from viewing direction 27. It is apparent that the direction of movement of image 22 on screen 10 caused by the change in weight of the commodity is the same as that of image 16. The half of the light that has passed half mirror 18 is reflected in succession by reflectors 23, 24, 25, 26 and 9 and reaches projection screen 10 so as to form image 29 of the projected portion of price scales 4 in reverse at side B of projection screen 10 at the position in point symmetry with respect to said image 22 about center point 14 of projection screen 10. The image 29 is read together with reference line N—N from viewing direction 28 after being reflected by reflector 36, the image 29 being reversed by the reflection by means of reflector 36 so as to be read from left to right. It is apparent that the direction of movement of image 29 caused by the change in the weight of the commodity is the same as that of image 15. In this connection, both the lengths of the optical paths starting at lens 17 and reaching projection screen 10 either along reflectors 18, 20 and 21 or along reflectors 18, 23, 24, 25, 26 and 9 are made substantially the same. By providing two viewing directions 27 and 28, both the seller and the customer can simultaneously observe the result of the weighing of the commodity, thereby eliminating misunderstanding on the part of either the seller or the customer. In calculating the price the commodity according to the unit price per unit weight, one of the price scales 4 corresponding to the unit price per unit weight of the commodity to be measured must be selected. To this end, projection lens 17 for projecting price scale 4, half mirror 18, reflectors 23, 24 and 25 are secured to horizontally movable frame 30 which is movable horizontally in the balance parallel to plate 1 by utilizing rollers 105 in such a manner that frame 30 moves laterally across a plurality of price scales 4 by the operation of switching knob 61 into the desired position so that lens 17 is in alignment with the selected price scale 4. Switching knob 61 may bear a plurality of graduations indicating unit prices per unit weight, respectively, frame 30 being moved by adjusting knob 61 so as to fit any one of graduations with fixed indicia (not shown) so that lens 17 is positioned in alignment with the selected price scale 4. The optical path 32 between reflectors 18 and 20 and the optical path 33 between reflectors 25 and 26 are directed in parallel to plate 1 and at a right angle with respect to price scales 4 by suitably selecting the position of each of reflectors 18, 20, 25 and 26, so that variation in the length of optical path 32 caused by the movement of frame 30 is at all times kept equal to the variation in the length of optical path 33, thereby preventing difference in size of images 22 and 29 by the movement of frame 30. The adjustment of focusing of projection lens 17 so as to form sharper images 22 and 29 on projection screen 10 as frame 30 moves can be effected, if necessary, such being effected by the conventional manner known by persons skilled in the art. Optical path 32 runs outside of reflector 12 so that they do not interfere with each other. As shown in FIG. 3, indications such as "g" showing the total weight, "$" showing the total price and "$ per 100g" showing the unit price per unit weight of the commodity are provided on projection screen 10 so that the reading of the calculations is made convenient.

In the balance in accordance with the present invention, means for focusing on projection screen 10 the images 54, 60 each indicating the unit price per unit weight are provided, said means being secured to movable frame 30 and including scales 50, 55 each indicating unit price per unit weight which are moved together with said frame 30. These scales 50, 55 are illuminated by the light sources not shown, respectively, which are located at stationary position behind scales 50, 55, respectively. The light from each of scales 50, 55 passes through each of projection lenses 51, 56 fixedly secured to the scales. The light having passed each of projection lenses 51, 56 is reflected by a series of reflectors 52, 53 and reflectors 57, 58 and 59, respectively, so that each of the reflected lights are projected onto projection screen 10 so as to form thereon images 54, 60 in reverse for indicating unit price per unit weight, respectively. Frame 30 is moved by adjusting switching knob 61 so that the selected unit price per unit weight in each of scales 50, 55 are aligned with projection lenses 51, 56, respectively. Thus, the indications of unit price per unit weight 54, 60 are viewed from respective viewing directions 27 and 28 after being reflected by reflectors 35, 36, respectively, together with images 15, 16 indicating the weight of the commodity and images 29, 22 indicating the price. Therefore, both the seller and the customer can observe simultaneously the total price and unit price of the commodity.

Figure 5:
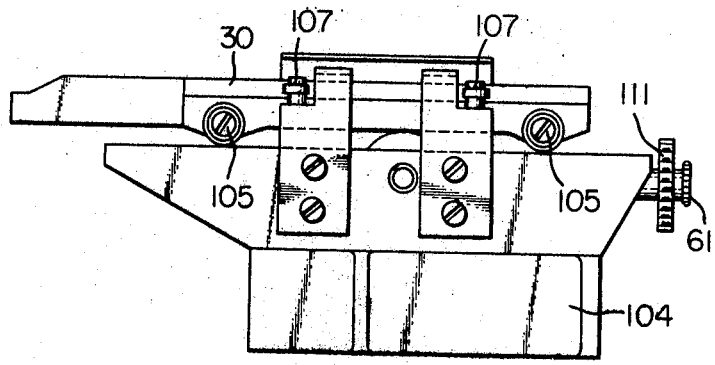
FIGS. 5–8 are views showing detailed construction of the frame carrying the movable portions of the optical system of FIG. 4, respectively.
Figure 6:
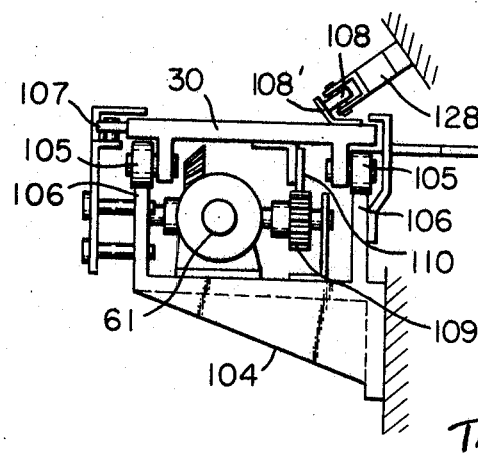

Since the scales of the present invention is constructed as described above, the selected portions of weight scales 3 actuated in response to the variation in the weight of the commodity to be measured, the selected portion of one of the price scales 4 corresponding to the unit price per unit weight and the indications 50, 55 of the unit price per unit weight are projected on projection screen 10 so as to provide two sets of images 15, 29, 54 and 16, 22, 60 in point symmetry to each other with respect to center point 14 on screen 10 Further, the projected portions of the weight scale and the price scale move in the same direction with respect to the reference line N—N, thereby eliminating misunderstanding in reading the result of the measurement The detailed construction of frame 30 of the present invention will be set forth below in connection with FIGS. 5–8. As shown in FIGS. 5 and 6, a pair of rotatable rollers 105 are mounted on the front of frame 30 while a rotatable roller 105 is mounted in rear side of the frame 30, these rollers 105 being slidably supported along two parallel spaced rails 106 provided on bracket 104 secured to the body of the balance of the present invention. This three point support of frame 30 by means of rollers 105 provides very stable movement of frame 30 along rails 106. Two side rollers 107 rotatable about the vertical axis and rotatably supported by said bracket 104 abut against the front side edge of frame 30 as shown. Rail 108' having inclined surface is provided adjacent to the rear side edge of frame 30 in parallel thereto and in parallel to rails 106 as shown in FIG. 6. Roller 108 rotatable about obliquely directed axis in parallel to the inclined surface of rail 108' and supported by arm 128 extending from the body of the balance obliquely downwardly at right angle to the surface of rail 108' is biased against rail 108' by resilient means provided in arm 128, so that frame 30 is moved without any lateral play by virtue of the provision of rollers 107, 108 with rollers 105 being prevented to be raised from rails 106. This provides smooth running of frame 30 along rails 106.

Knob 61 is provided to move frame 30 so that selected price scale 4 comes in alignment with lens 17 in response to the adjustment of knob 61 so as to select the unit price per unit weight in accordance with the commodity. The rotation of knob 61 is transmitted to gear 109 through gear train, said gear 109 resulting in the movement of rack 110 which is secured to frame 30 and meshes with gear 109 so that frame 30 is moved. A plurality of indicia 111 indicating the unit prices per unit weight of the commodity or reference numerals are provided on the circumferential surface of said knob 61 as previously stated. By fitting a selected one of said indicia 111 with fixed index (not shown), frame 30 is moved to the position where selected price scale 4 and the selected portions of scales 50, 55 for indicating the unit price per unit weight are brought to the projecting positions by means of projection lenses 17, 51 and 56. The coupling mechanism between frame 30 and knob 61 can be any of the conventional mechanisms in-so-far as it can move frame 30 to the desired position in response to the adjustment of knob 61. Click means may be preferably provided on knob 61 so as to snugly keep knob 61 in the adjusted position. When indicia 111 is marked so as to directly indicate the value of the unit price per unit weight, either one of the images 54 and 60 on screen 10 indicating the unit price per unit weight, and hence either one of scales 50 and 55 together with corresponding optical system can be eliminated, because either the seller or the customer can be directly notified of the selected unit price per unit weight by observing the indicia of knob 61 without the necessity of viewing image 54 or 60.

Figure 7:
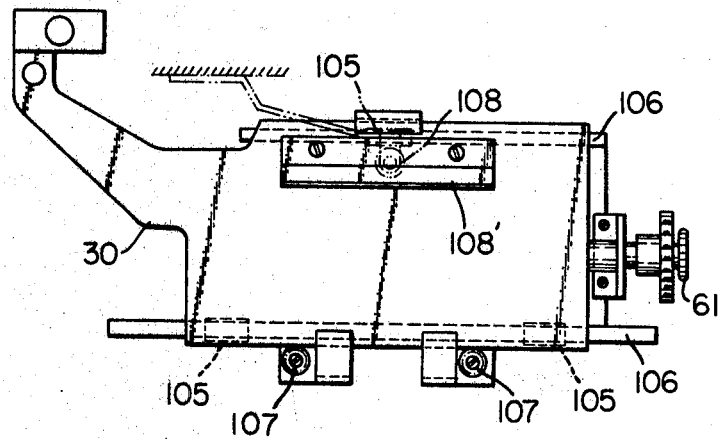
Figure 8:
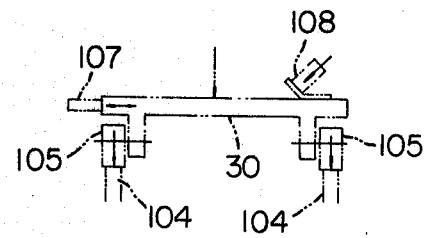

FIG. 7 is a plan view showing the arrangement of frame 30 with guide means consisting of rollers 105, 107 and 108 and rails 106, 108'. FIG. 8 shows how the smooth movement of frame 30 is achieved by the guide means as described above, roller 108 providing not only horizontal component of the biasing force to resiliently force the front edge of frame 30 against rollers 107 so that the play in lateral movement of frame 30 is prevented but also vertical component of the biasing force which prevents frame 30 from moving apart from rails 106.

Figure 9:
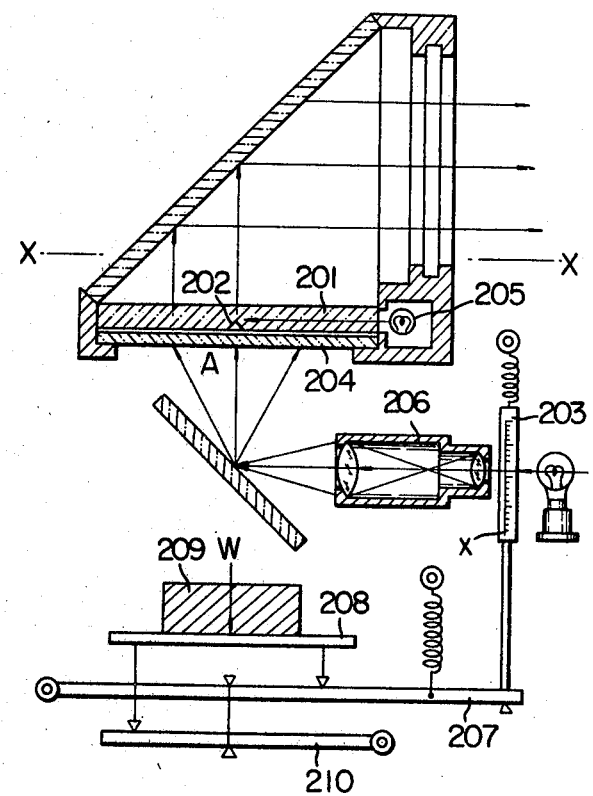
FIGS. 9 and 10 are views showing another embodiment of the balance in accordance with the present invention, respectively.
Figure 10:
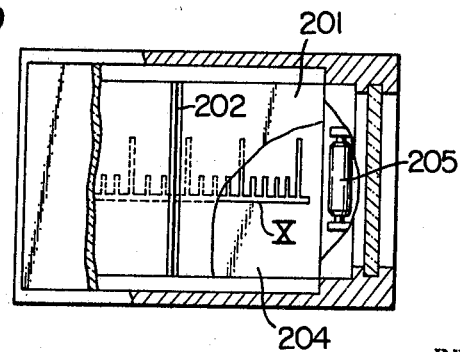

FIGS. 9 and 10 show another embodiment of the present invention.

In this embodiment, reference line 202 in the form of V-shaped groove is provided on the rear surface of transparent indicating plate 201. Projection screen 204 is located in close contact with the rear surface of said indicating plate 201 on which the images of the weight scale and the price scale on scale plate 203 are projected by the light from a light source through lens 206 and a mirror. A light source 205 provided adjacent to one side edge of transparent indicating plate 201 illuminates reference line 202. Said transparent indicating plate 201 is made of a transparent glass plate or transparent synthetic resin plate. Light source 205 may be an electric lamp or a luminous body. Projection screen 204 contacting with the rear surface of indicating plate 201 forms the images projected from scales $x$ on scale plate 203. The images are viewed together with reference line 202 after being reflected by a mirror as illustrated in FIG. 9.

Scale Plate 203 is pivotally connected to one end of balancing beam 207 which is pivotally supported at the other end and is suspended by spring means so as to resist the weight W of commodity 209 to be measured which is supported on beam 207 and another beam 210 pivoted at an end and connected at intermediate portion thereof to the intermediate portion of said beam 207. Thus scale plate 203 is moved vertically by the amount determined by the weight W of the commodity 209, the portion of scales $x$ on scale plate 203 to be projected on screen 204 through lens 206 being correspondingly varied by the movement of the scale plate 203 thereby providing correct reading of the price and/or the weight of the commodity in relation to reference line 202.

I claim:

1. A scale in which the price and weight of the commodity can be read from both sides, the scales comprising a projection optical system including light source means, projection lens means, scale plate means between said light source and said lens means and having price and weight scales located in the vertical direction thereon, reflecting means positioned for receiving projected images from said lens means and reflecting them, and projection screen means for receiving the reflected images, a main body in which said optical system is housed, a platform adapted to support the commodity to be measured and vertically movable as a function of the weight of the commodity loaded thereon, means for transmitting the movement of said platform caused by loading the commodity thereon and coupled between the platform and said scale plate means to move the scale plate means vertically, said scale plate means having the weight scale thereon having a pair of graduations for projection onto said projection screen means at the respective sides thereof symmetrically to the center point of said screen means so as to be viewed in readable form simultaneously from opposite sides of the scales, and further having a plurality of price scales thereon each graduated in accordance with the unit price per unit weight of the commodity, said projection lens means being movable relative to said price scales to direct one of said price scales according to the unit price per unit weight of the commodity to said reflecting means so as to be projected onto said screen means at both sides thereof symmetrically to the center point of said screen means parallel to the images of said weight scale projected on said screen means and so as to be viewed in readable form from said opposite sides of the balance, said screen means including two mirrors oppositely inclined to each for reflecting the images to be viewed from said opposite sides, the images of the price scale projected onto said projection screen means resulting from the variation in the weight of the commodity loaded on said platform moving in the same direction as that portion of the weight scale projected onto said projection screen means thereby avoiding confusion in the reading of the measured values.

2. A scales according to claim 1, wherein a reference line for reference to the reading of the images of the price and weight scales projected onto the screen means is cut in a transparent indicating plate located closely adjacent to said projection screen means, said reference line being of V-shaped configuration in cross-section, a light source being provided adjacent to one side edge of said transparent indicating plate so as to illuminate said V-shaped reference line by the light passing through said plate from said light source in order to clearly show the reference line.

3. A scales according to claim 1, wherein the projection lens for projecting said selected price scale is manually movable horizontally along said scale plate together with its associated reflecting means in accordance with the unit price per unit weight of the commodity to be measured so that said projection lens is aligned with said selected price scale, while the projection lens for projecting said weight scale is stationary, so that both of said projection lenses project the selected price scale and the weight scale simultaneously onto said projection screen means.

4. A scales according to claim 3, wherein a pair of scales for unit price per unit weight of the commodity are provided so as to be projected onto projection screen means at two positions in point symmetry about the center point of said screen means through a pair of stationary projection lenses, respectively, said scales being movable horizontally together with said projection lens for projecting the selected price scale, so that the portion of the unit price scales which is selected according to the unit price per unit weight of the commodity is projected onto the projection screen means together with said selected price scale and the weight scale.

5. A scales according to claim 1, wherein said projection lens for projecting the selected price scale is mounted on a horizontally movable frame together with reflecting means associated with said projection lens, said frame being provided with two horizontally rotatable rollers at one side while one horizontally rotatable roller is provided at the other side, said two rollers and one roller being rollingly supported on each of a pair of parallel rails secured to the body of the balance, a pair of vertically rotatable rollers being provided on said body which are rotatably in contact with one straight lined side of said frame so as to move said frame along a straight line, and inclined rail being provided adjacent to the other side of said frame opposite to said straight lined side in parallel relation thereto, said inclined rail being resiliently urged downwardly and toward said straight lined side by a rotatable roller mounted on the body of the scales and resiliently urged toward said inclined rail thereby affording stability and smoothness of the movement of said frame by virtue of three point support given by said two horizontally rotatable rollers and one horizontally rotatable roller provided on said frame and the resilient force applied to said inclined rail by means of said resiliently urged roller provided on the body of the scales which assures positive rolling contact of said straight lined ride of said frame with said pair of vertically rotatable rollers to guide the horizontal movement of said frame.

6. A scales according to claim 5, wherein said frame is drivable along said parallel rails by a knob provided on the body of the scales through transmission means operatively connected to said knob and said frame in accordance with the unit price per unit weight of the commodity to be measured.

7. A scales according to claim 6, wherein said knob bears around its periphery graduations indicating the unit price per unit weight of the commodity, the movement of said frame to align one of the price scales with the projection lens therefor according to the unit price per unit weight of the commodity being effected by matching the selected value of said graduations with a fixed index secured to the stationary portion of the scales.

References Cited

UNITED STATES PATENTS

| | | | |
|---|---|---|---|
| 1,487,514 | 3/1924 | Goss | 177—178 |
| 1,880,415 | 10/1932 | Carroll | 177—178 |
| 1,993,592 | 3/1935 | Carroll | 177—178 |
| 2,541,365 | 2/1951 | Kauffman | 177—178 |
| 2,697,963 | 12/1954 | Fink | 177—178 |
| 2,723,113 | 11/1955 | Meeker et al. | 177—178 X |
| 3,279,551 | 10/1966 | Gittus | 177—177 |

RICHARD B. WILKINSON, Primary Examiner

G. H. MILLER, Jr., Assistant Examiner

U.S. Cl. X.R.

353—40